(12) United States Patent
Dulac et al.

(10) Patent No.: US 8,413,876 B2
(45) Date of Patent: *Apr. 9, 2013

(54) ALUMINIUM ALLOY STRIP FOR BRAZING

(75) Inventors: Sandrine Dulac, Grenoble (FR); Sylvain Henry, Saint Jean de Moirans (FR)

(73) Assignees: Constellium France, Paris (FR); Constellium Rolled Products, Ravenswood, LLC, Ravenswood, WV (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/171,644

(22) Filed: Jun. 29, 2011

(65) Prior Publication Data

US 2011/0315748 A1 Dec. 29, 2011

Related U.S. Application Data

(63) Continuation of application No. 10/596,060, filed on May 26, 2006, now abandoned.

(51) Int. Cl.
*B23K 31/02* (2006.01)

(52) U.S. Cl.
USPC .................. 228/219; 228/248.1; 228/262.51

(58) Field of Classification Search .................. None
See application file for complete search history.

(56) References Cited

U.S. PATENT DOCUMENTS

| | | | | |
|---|---|---|---|---|
| 3,898,053 A * | 8/1975 | Singleton, Jr. | ............... | 428/654 |
| 4,929,511 A * | 5/1990 | Bye et al. | ...................... | 428/606 |
| 5,530,090 A * | 6/1996 | Khouri | ......................... | 528/322 |
| 5,547,517 A * | 8/1996 | Iwai | ............................. | 148/24 |
| 5,863,669 A * | 1/1999 | Miller | ........................... | 428/654 |
| 6,234,377 B1 * | 5/2001 | Teshima et al. | ................ | 228/183 |
| 6,764,558 B2 | 7/2004 | Kucza et al. | | |
| 6,923,876 B2 | 8/2005 | Kucza et al. | | |
| 7,926,701 B2 * | 4/2011 | Dulac et al. | .............. | 228/262.51 |
| 2001/0040180 A1 | 11/2001 | Wijenberg et al. | | |
| 2002/0041822 A1* | 4/2002 | Childree | ........................ | 420/549 |
| 2003/0155409 A1* | 8/2003 | Dockus et al. | ................ | 228/245 |
| 2004/0035910 A1* | 2/2004 | Dockus et al. | ................ | 228/56.3 |
| 2004/0035911 A1* | 2/2004 | Dockus et al. | ................ | 228/56.3 |
| 2004/0038070 A1* | 2/2004 | Dockus et al. | ................ | 428/652 |

FOREIGN PATENT DOCUMENTS

| | | |
|---|---|---|
| JP | 58040495 | 3/1983 |
| JP | 59-126747 A * | 7/1984 |
| JP | 05117796 | 5/1993 |
| JP | 08-120384 | 5/1996 |
| JP | 08120380 | 5/1996 |

(Continued)

OTHER PUBLICATIONS

Patent Abstract of Japan, vol. 2000, No. 13, Feb. 5, 2001 & JP 2000 303132 A (Kobe Steel Ltd., et al.) Oct. 31, 2000, Abstract.

(Continued)

*Primary Examiner* — Kiley Stoner
(74) *Attorney, Agent, or Firm* — Banner & Witcoff, LTD

(57) ABSTRACT

The invention relates to a strip or sheet of aluminium alloy, comprising at least 80% by weight of aluminium and 0.01 to 0.5% yttrium and/or 0.05 to 0.5% bismuth, coated on at least one face with a brazing alloy. Said sheets and strips are used for the production of pieces by non-flux brazing.

6 Claims, 1 Drawing Sheet

FOREIGN PATENT DOCUMENTS

| | | |
|---|---|---|
| JP | 08120389 | 5/1996 |
| JP | 2000303132 | 10/2000 |
| JP | 2001-300762 A * | 10/2001 |
| JP | 2003-126986 A * | 5/2003 |
| WO | 99/60323 | 11/1999 |
| WO | 00/71784 | 11/2000 |
| WO | 0240729 | 5/2002 |
| WO | 02060639 | 8/2002 |

OTHER PUBLICATIONS

Shinji et al (JP 08-120389 English Machine Translation), May 1996.

* cited by examiner

ALUMINIUM ALLOY STRIP FOR BRAZING

CROSS REFERENCE TO RELATED APPLICATIONS

This application is a continuation application of pending U.S. Ser. No. 10/596,060, filed May 26, 2006, now abandoned, which is incorporated by reference in its entirety. Applicant claims, under 35 USC §119, the benefit of priority of the filing date of a Patent Cooperation Treaty patent application, Application No. PCT/FR2004/003003, filed on Nov. 24, 2004, which is incorporated herein by reference, wherein Patent Cooperation Treaty patent application, Application No. PCT/FR2004/03003 was not published under PCT Article 21(2) in English. Applicant also claims, under 35 USC §119, the benefit of priority of the filing date of a French patent application, Serial Number FR 03 14001, filed on Nov. 28, 2003, which is incorporated herein by reference.

FIELD OF THE INVENTION

The invention relates to aluminium alloy strips, possibly cladded on one or two faces with a brazing alloy and intended for the production of brazed parts, particularly heat exchangers for automobiles or buildings, and more particularly parts assembled by fluxless brazing under a controlled atmosphere.

STATE OF THE ART

The most frequently used process for the assembly of automobile heat exchangers is brazing. This is based on the use of a cladded strip composed of a so-called "core" alloy coated on one or two faces with a so-called "brazing" alloy, at least for one of the components to be assembled. This so-called "brazing" alloy is characterised by a liquid temperature about 30° C. less than the solidus temperature of the core alloy. By applying an appropriate heat treatment, it is possible to melt only the cladding, which then wets the surfaces in contact allowing good assembly after the assembly has cooled.

There are three different brazing techniques presently available:

The most widespread is brazing under a controlled nitrogen atmosphere, after coating parts to be assembled with a non-corrosive "flux", the most frequently used being the Nocolok® flux. This product, designed to dissolve the surface oxide layer on aluminium and consequently to increase the wettability of the surfaces, is of the potassium fluoro-aluminate type. A number of problems arise when it is used. Obviously, the product has an intrinsic cost; its deposition requires special installations that frequently prevent complete automation of exchanger production lines; finally an effluent treatment must be arranged.

Another older technique but one still used particularly in North America is vacuum brazing. This process makes it necessary to use cladding that contains magnesium; this element is segregated on the surface and vaporises in the vacuum, capturing residual traces of oxygen. It thus avoids the oxide layer, initially broken by differential expansion, from reforming. No flux is necessary, but vacuum-creating installations are very complicated and associated maintenance costs are very high. For these economic reasons, existing lines are progressively being abandoned and replaced by Nocolok® lines.

Finally, a third process used more marginally, consists of depositing a nickel layer instead of the flux. Brazing is then done under nitrogen. The energy released during the brazing cycle by the creation of Al—Ni phases on the cladding surface is sufficient to break the oxide layer.

The main problem consists of performing the brazing operation on existing Nocolok® lines, since these are the most widespread and the most economic, without the use of flux or any other complex surface preparation and without causing degradation of the final properties of exchangers that will be assembled using this technique.

The solution that has been developed most widely in this field is an adaptation of the nickel deposition brazing process. Although increasingly simplified deposition techniques have been found and used, for example as described in patent application WO 02/07928 (Corus), they never provide more than a partial solution to the problem. The manufacturer of exchangers, or of aluminium strips if the operation is carried out by this manufacturer, must always add on specific installations for surface preparation before brazing and must continue to manage effluents, this time generated by nickel plating baths. Furthermore, although progress has been made in terms of resistance to corrosion as mentioned in patent application WO 02/060639 (Corus), the indicated performances do not always reach the performances claimed for Nocolok® brazed products (for example see patent application WO 02/40729 by Pechiney Rhenalu).

Other solutions are related to adaptation of the cladding alloy and/or atmospheric conditions in brazing furnaces, as for example in U.S. Pat. No. 3,811,177 (VAW) that mentions the addition of the Bi, Sr, Ba or Sb elements into brazing alloys to modify its surface tension. The effect of bismuth on the surface tension is also mentioned in patent EP 0004096 (Ford). More recently, the advantage of adding sodium, possibly accompanied by potassium or bismuth, is mentioned in application WO 01/98019 by Kaiser Aluminium. Finally in EP 1306207 (Sky Aluminium), the brazing that contains Mg and Bi is covered with a thin layer formed of an aluminium alloy that will remain solid when it begins to melt; it will only break later during the brazing cycle, releasing liquid cladding that then wets its upper surface. Oxidation of the liquid brazing alloy is avoided by working under an atmosphere for a short period. The oxide present on the thin layer is broken when it is surrounded by liquid.

BRIEF SUMMARY OF THE INVENTION

The purpose of the invention is to enable production by fluxless brazing of parts made of aluminium alloy under good economic conditions, and particularly using the same equipment as is used for brazing with flux under a controlled atmosphere.

The purpose of the invention is an aluminium alloy strip or sheet containing 0.01 to 0.5% of yttrium and/or 0.05 to 0.5% of bismuth, coated on at least one face with a brazing alloy. The coating may be a layer cladded by co-rolling, for example an aluminium alloy containing 4 to 15% of silicon. It may also be a layer comprising particles of a brazing alloy, particularly particles of Al—Si alloy, possibly coated in a resin.

Another purpose of the invention is a brazed part, particularly a heat exchanger made using an aluminium alloy strip or sheet containing 0.01 to 0.5% of yttrium and/or 0.05 to 0.5% of bismuth.

DESCRIPTION OF THE INVENTION

Figure 1A:
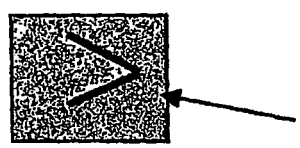
FIG. 1a and 1b show a top and side view respectively of V test pieces used in the examples to evaluate the brazability.

Unlike the techniques mentioned above, the invention is designed to modify the composition of the core alloy, such that brazing can take place without any deposition, under standard controlled atmosphere conditions, and that can be achieved without modifying the brazing installations used at equipment manufacturers.

Surprisingly, the addition of some elements in the core, such as yttrium at a content of 0.05% or bismuth at a content of about 0.15%, can result in a very satisfactory quality of brazed joints for fluxless brazing under nitrogen.

The method is applicable to all types of aluminium alloys containing at least 80% by weight of aluminium, and particularly alloys for which the composition satisfies the following conditions (% by weight) before the addition of elements specifically intended to enable fluxless brazing:

Si<1.0; Fe<1.0; Cu<1.0; Mn<2.0; Mg<3.0; Zn<6.0; Ti<0.3; Zr<0.3; Cr<0.3; Hf<0.6; V<0.3; Ni<2.0; Co<2.0; In<0.3; other elements<0.05 each and 0.15 total; remainder aluminium.

The sheet or strip may be cladded by co-rolling on one or two faces with a brazing aluminium alloy, usually an alloy containing 4 to 15% of silicon. The brazing alloy may contain other additives such as copper, magnesium or zinc. It may also contain elements designed to modify the surface tension of the alloy, such as Ag, Be, Bi, Ce, La, Pb, Pd, Sb, Y or mischmetal, in other words a mixture of unseparated rare earth metals. In the case in which the brazing alloy is cladded on a single face, the other face may be coated by a sacrificial alloy, usually of the Al—Zn type, in a manner commonly known and intended to improve the resistance of the core alloy to corrosion.

The brazing alloy may also be deposited in the form of particles, particularly Al—Si particles, for example as described in patent EP 0565568 (Alcan International). For brazing under a controlled atmosphere, the brazing alloy particles are usually associated with flux particles, particularly flux based on fluorides such as potassium fluoro-aluminate, and a binder such as a polymer resin. One particular advantage of the invention in this case is to avoid the presence of flux in the coating.

The alloy sheet with the addition of bismuth and/or yttrium may also be used uncoated when it is associated with another sheet coated with a brazing alloy for the production of the brazed part.

EXAMPLES

Example 1

Four plates of core alloys with the following compositions were cast:

|  | ALLOY | | | | | | | | |
| --- | --- | --- | --- | --- | --- | --- | --- | --- | --- |
|  | SI | FE | CU | MN | MG | TI | Y | BI | CA |
| M | 0.40 | 0.22 | 0.63 | 0.57 | 0.47 | 0.08 | — | — | — |
| M + Y | 0.39 | 0.24 | 0.61 | 0.57 | 0.47 | 0.09 | 0.06 | — | — |
| M + BI | 0.39 | 0.22 | 0.62 | 0.59 | 0.49 | 0.09 | — | 0.15 | — |
| M + CA | 0.40 | 0.22 | 0.63 | 0.57 | 0.47 | 0.08 | — | — | 0.05 | together with a 4047 cladding alloy plate (Al-12% Si). Assemblies were made from these plates such that the thickness of the cladding alloy represents 10% of the total thickness. These assemblies were hot rolled and then cold rolled so as to produce 0.3 mm thick cladded strips. These strips were then subjected to a restoration treatment for 10 h at 260° C.

Figure 1B:
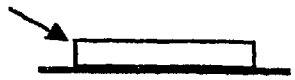
Figure 2:
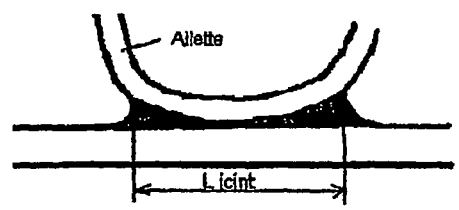
FIG. 2 shows the definition of the width of the brazed joint used in the brazability test described in the examples.

The test piece illustrated in FIG. 1 was used to evaluate the brazability of these materials. The "V" is composed of a 0.3 mm thick bare strip made of a 3003 alloy in the H24 temper. A 15-minute degreasing treatment at 250° C. was applied to the metal to be brazed. No other surface preparation was used and in particular no flux was deposited. Brazing is done in a double-wall glass furnace in which it is possible to view movements of liquid brazing alloy and the formation of joints during the treatment. The thermal cycle is composed of a temperature rise phase up to 610° C. at a rate of approximately 20° C/min, holding for 2 minutes at 610° C., and then lowering at a rate of about 30° C/minute. The complete process is done under continuous nitrogen scavenging, at a rate of 8 l/min.

The results are marked A to E at the following scale:

|  | Mark | | | | |
| --- | --- | --- | --- | --- | --- |
|  | A | B | C | D | E |
| Joint length formed as a percent of the total length | 100% | 90% | 75% | 50% | 0% |

The results are given in table 1:

TABLE 1

| Core | Cladding | Brazability |
| --- | --- | --- |
| M | 4047 | E |
| M + Y | 4047 | A |
| M + Bi | 4047 | A |
| M + Ca | 4047 | E |

The improvement in the brazability obtained due to the addition of Y or Bi to the core alloy can be seen.

Example 2

Two plates with the following compositions were cast in the same way:

|  | Alloy | | | | | | |
| --- | --- | --- | --- | --- | --- | --- | --- |
|  | Si | Fe | Cu | Mn | Mg | Ti | Y |
| N | 0.17 | 0.18 | 0.64 | 1.37 | — | 0.08 | — |
| N + Y | 0.19 | 0.17 | 0.67 | 1.32 | — | 0.09 | 0.06 | together with a 4045 cladding alloy plate (Al-10% Si). The transformation procedure and the tests carried out are exactly the same as for example 1.

The results are given in table 2:

TABLE 2

| Core | Cladding | Brazability |
| --- | --- | --- |
| N | 4045 | E |
| N + Y | 4045 | A |

It can be seen that the addition of yttrium to alloy N significantly improves the brazability.

Example 3

Two plates with the following compositions were cast in the same way:

| | Alloy | | | | | | |
|---|---|---|---|---|---|---|---|
| | Si | Fe | Cu | Mn | Mg | Ti | Y |
| P | 0.15 | 0.35 | 0.1 | 0.1 | 0.8 | 0.125 | — |
| P + Y | 0.15 | 0.35 | 0.1 | 0.1 | 0.8 | 0.125 | 0.06 | together with a 4045 cladding alloy plate (Al-10% Si). The transformation procedure and the tests carried out are exactly the same as for example 1.

The results are given in table 3:

TABLE 3

| Core | Cladding | Brazability |
|---|---|---|
| P | 045 | E |
| P + Y | 4045 | A |

It can be seen that the addition of yttrium to alloy P significantly improves the brazability.

The invention claimed is:

1. A method of manufacturing a brazed part comprising fluxless brazing under a controlled atmosphere of nitrogen and an aluminum alloy core strip or sheet comprising 0.01 to 0.5% of yttrium, and the following elements included in the following percentages by weight:
Si<1.0; Fe<1.0; Cu<1.0; Mn<2.0; Mg<3.0; Zn<6.0; Ti<0.3; Zr<0.3; Cr<0.3; Hf<0.6; V<0.3; Ni<2.0; Co<2.0; In<0.3; Sn<0.3; other elements<0.05 each and 0.15 total;
wherein the core strip or sheet is coated on at least one face with a brazing aluminum alloy wherein the brazing alloy contains at least one element for modifying the surface tension of the alloy, the element selected from the group consisting of Ag, Be, Bi, Ce, La, Pb, Pd, Sb, and mischmetal.

2. A method according to claim 1, wherein the core strip or sheet is coated with brazing alloy particles.

3. A method according to claim 2, wherein the brazing alloy particles are coated with a polymer resin.

4. A method of manufacturion a brazed part comprising fluxless brazing under a comtrolled atmosphere of nitrogen and an aluminum alloy core strip or sheet comprising 0.01 to 0.5% of yttrium, 0.05 to 0.5% bismuth, and the following elements included in the following percentages by weight:
Si<1.0; Fe<1.0; Cu<1.0; Mn<2.0; Mg<3.0; Zn<6.0; Ti<0.3; Zr<0.3; Cr<0.3; Hf<0.6; V<0.3; Ni<2.0; Co<2.0; In<0.3; Sn<0.3; other elements<0.05 each and 0.15 total;
wherein the core strip or sheet is coated on at least one face with a brazing aluminum alloy wherein the brazing alloy contains at least one element for modifying the surface tension of the alloy, the element selected from the group consisting of Ag, Be, Bi, Ce, La, Pb, Pd, Sb, and mischmetal.

5. A method according to claim 4, wherein the core strip or sheet is coated with brazing alloy particles.

6. A method according to claim 5, wherein the brazing alloy particles are coated with a polymer resin.

* * * * *

UNITED STATES PATENT AND TRADEMARK OFFICE
CERTIFICATE OF CORRECTION

PATENT NO. : 8,413,876 B2
APPLICATION NO. : 13/171644
DATED : April 9, 2013
INVENTOR(S) : Dulac et al.

Page 1 of 1

It is certified that error appears in the above-identified patent and that said Letters Patent is hereby corrected as shown below:

On the Title Page, Item [30] Foreign Priority Claims:
Please add "PCT/FR2004/003003 filed November 24, 2004"
Please add "FR0314001 filed November 28, 2003"

Signed and Sealed this
Fifteenth Day of October, 2013

Teresa Stanek Rea
*Deputy Director of the United States Patent and Trademark Office*